United States Patent [19]

Kramer

[11] Patent Number: 4,583,816
[45] Date of Patent: Apr. 22, 1986

[54] PREOBJECTIVE HOLOGON SCANNER SYSTEM

[75] Inventor: Charles J. Kramer, Pittsford, N.Y.
[73] Assignee: Holotek Ltd., Rochester, N.Y.
[21] Appl. No.: 635,073
[22] Filed: Jul. 27, 1984
[51] Int. Cl.$^4$ .......................................... G02B 26/10
[52] U.S. Cl. .................................................. 350/3.71
[58] Field of Search ...................................... 350/3.71

[56] References Cited

U.S. PATENT DOCUMENTS

| | | | |
|---|---|---|---|
| 3,940,202 | 2/1976 | Kato et al. | 350/3.71 |
| 3,953,105 | 4/1976 | Ih | 350/3.71 |
| 4,094,576 | 6/1978 | Heiling | 350/3.71 |
| 4,289,371 | 9/1981 | Kramer | 350/3.71 |
| 4,508,421 | 4/1985 | Herloski | 350/3.71 |

OTHER PUBLICATIONS

Kramer, Charles J., "Holographic Laser Scanner, for Nonimpact Printing", *Laser Focus*, Jun. 1981, pp. 70–82.

Kramer, Charles J., "Hologon Lase Scanners for Non-Impact Printing", *Proceedings of the SPIE*, vol. 390, pp. 165–173.

Funato, Hiroyoshi, "Holographic Scanner for Laser Printer", *Proceeding of the SPIE*, vol. 390, pp. 174–182.

*Primary Examiner*—Bruce Y. Arnold
*Attorney, Agent, or Firm*—Martin Lukacher

[57] ABSTRACT

A hologon scanner system in which a laser beam is scanned across a receptor surface with an essentially bow-free scan. A focusing lens comprised of symmetrical, nonanamorphic optical elements is positioned in the scanned beam between the hologon deflector and the image plane. The focusing lens is provided with barrel or pincushion distortion and is tilted with respect to the scanned beam and bends the beam to correct for the bow introduced by the hologon deflector.

14 Claims, 5 Drawing Figures

PREOBJECTIVE HOLOGON SCANNER SYSTEM

The present invention relates to methods and apparatus for scanning a laser beam across an image plane, such as provided by a photoreceptor, with the use of a hologon deflector (diffraction grating based deflector element) so as to provide an essentially bow-free scan. The invention more particularly relates to a system in which a preobjective hologon scanner arrangement is used in which a focusing lens follows the hologon deflector and focuses the beam on the image plane, wherein the bow of the scan line produced by the hologon deflector is minimized.

The present invention is especially suitable for use in laser printers for the reproduction of continuous and half-tone images (called reprographic reproduction) as well as for the reproduction of alphanumeric and line graphic images (called orthographic reproduction). Also, the straightness of scan provided by the present invention makes it well suited for scanning machined parts in metrological applications.

Resolution requirements on laser printers are becoming more and more stringent, especially for reprographic reproduction. The scan line trajectory along the image plane may have a bow band (the maximum distance in a direction perpendicular to a straight scan line) which is commensurate with the spot size of the laser beam on the surface of the photoreceptor in the image plane, even when minimized in accordance with the systems heretofore described by applicant (see, C. J. Kramer, U.S. Pat. No. 4,289,371, issued Sept. 15, 1981; C. J. Kramer, *Laser Focus*, page 72 (June 1981); and C. J. Kramer, *Proceedings of SPIE*, Vol. 390, page 165 (1983)).

In addition to the bow minimization system described by applicant in the documents identified above, it has been proposed to use anamorphic optics and auxilliary reflecting mirrors for bow correction of a scanning line produced by a hologon scanner (see H. Funato, *Proceedings of SPIE*, Vol. 390, page 174 (1983) and the following U.S. Pat. Nos. 3,940,202, issued Feb. 24, 1976; 3,953,105, issued Apr. 27, 1976; and 4,094,576, issued June 13, 1978).

It has been discovered in accordance with the invention that bow of the scanning line can be corrected by tilting the lens, usually used with the hologon deflector to produce the scanning spot, so that the optical axis of the lens is not coaxial with the diffracted beam, but makes an angle therewith. This angle is sufficient to bend the scanning line in a sense opposite to the bow in the line produced by the hologon deflector when the focusing lens is provided with distortion for changing the velocity of the scan. This distortion may be barrel or pincushion distortion, and reference may be had to the text, Born and Wolf, *Principles of Optics,* 217, Pergamon Press, New York (1970) for further information respecting such distortion in lenses. Laser scanner focusing lenses usually incorporate barrel distortion for providing the scan with constant velocity across the flat surface of the image plane. These lenses are usually referred to as $f\theta$ lenses, since they correct for nonlinearity in the scan which is approximately $f \tan \theta$, where $f$ in the focal length of the lens and $\theta$ is the deflection of the beam about the center of the scan.

It has been found, in accordance with the invention, that by tilting a focusing lens with distortion, a bow trajectory is produced having increasing values on each side of the center of scan. When the lens is tilted in the opposite sense, the bow trajectory has decreasing values. A lens having barrel distortion provides bow trajectories opposite to the trajectories produced by a lens having pincushion distortion.

A simple focusing lens comprised of spherical lens elements and having barrel or pincushion distortion may be used for scan line bow correction by tilting the lens and thereby bending the scanning line to produce bow trajectories which reduce the bow produced by the hologon deflector.

Scan line bow correction, in accordance with the present invention, provides freedom for the design of hologon scanner systems. Wavelength to grating period ratios ($\lambda/d$) and incidence angles ($\theta_i$) may be used which do not provide for bow band minimization in accordance with the techniques described in the above referenced documents by C. J. Kramer. Nevertheless, scan line bow may be corrected through the use of a tilted focusing lens that incorporates distortion. Equal angles of incidence and diffraction may be used even though the choice of such angles would not provide for bow band minimization. Having equal incidence and diffraction angles ($\theta_i = \theta_d$) is desirable in that scan line sensitivity to wobble of the hologon deflector is reduced as discussed in the above-referenced documents authored by C. J. Kramer.

Accordingly, it is the principal object of the present invention to provide improved methods and apparatus for correcting scan line bow in scanners useful in laser printers and laser metrological applications.

It is a further object of the present invention to provide an improved hologon scanner system in which the bow band of the scanning line is minimized.

It is a still further object of the present invention to provide improved methods and apparatus for bow band correction in scanners which may be implemented with optical elements usually found in the scanners and without imposing additional difficulties in the alignment of such elements.

It is a still further object of the present invention to provide improved methods and apparatus for correcting scan line bow in hologon scanner systems which enables greater freedom of design of such systems through the selection of grating parameters, laser wavelengths and beam angles than has been provided with scanning line bow correction techniques which heretofore have been available.

The foregoing and other objects, features and advantages of the invention, as well as preferred embodiments and best modes presently known for practicing the invention will become more apparent from a reading of the following description in connection with the accompanying drawings in which.

Figure 2:
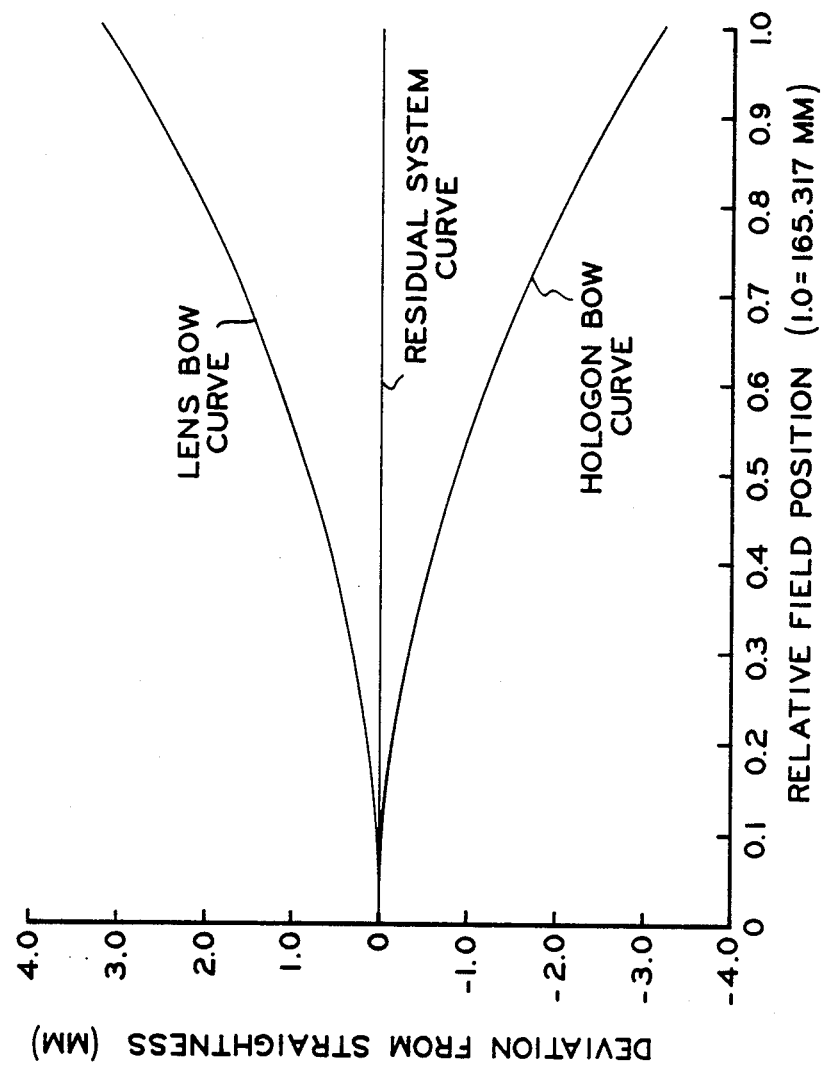
FIG. 2 is a graph plotting the scan line bow as a function of the relative field position of the scanning spot on one side of the center of scan (the curves on the opposite side being a mirror image of the curves shown on the graph)
Figure 3:
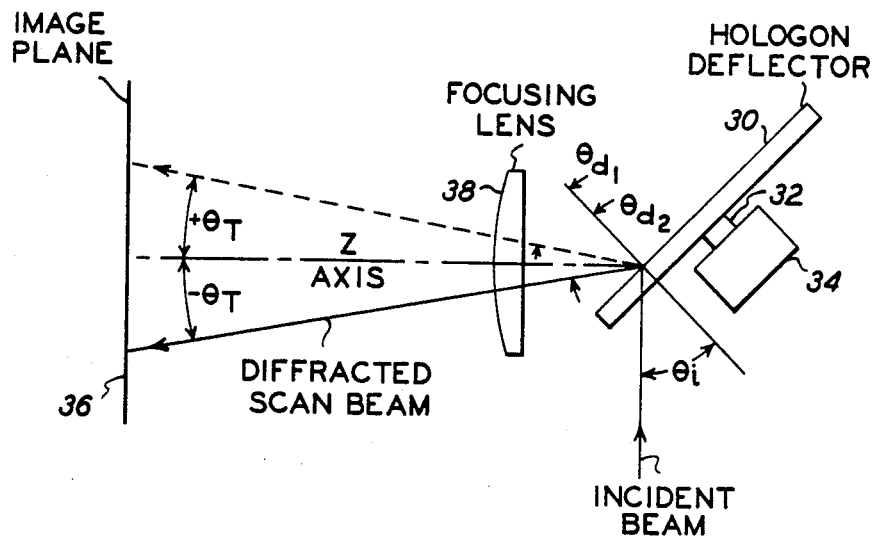
FIG. 3 is a diagramatic view schematically illustrating another embodiment of the invention.
Figure 4:
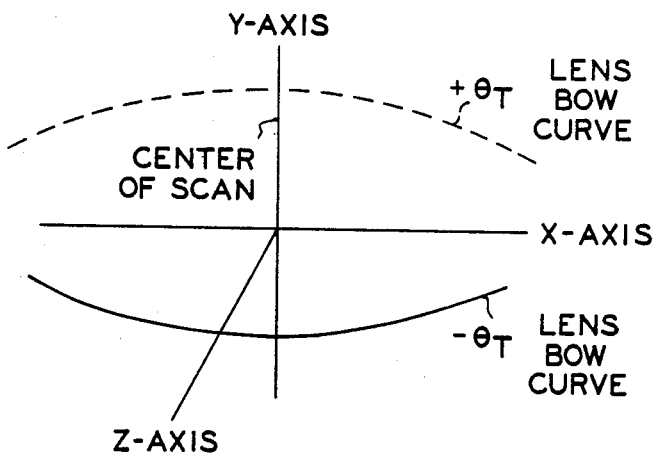
Figure 5:
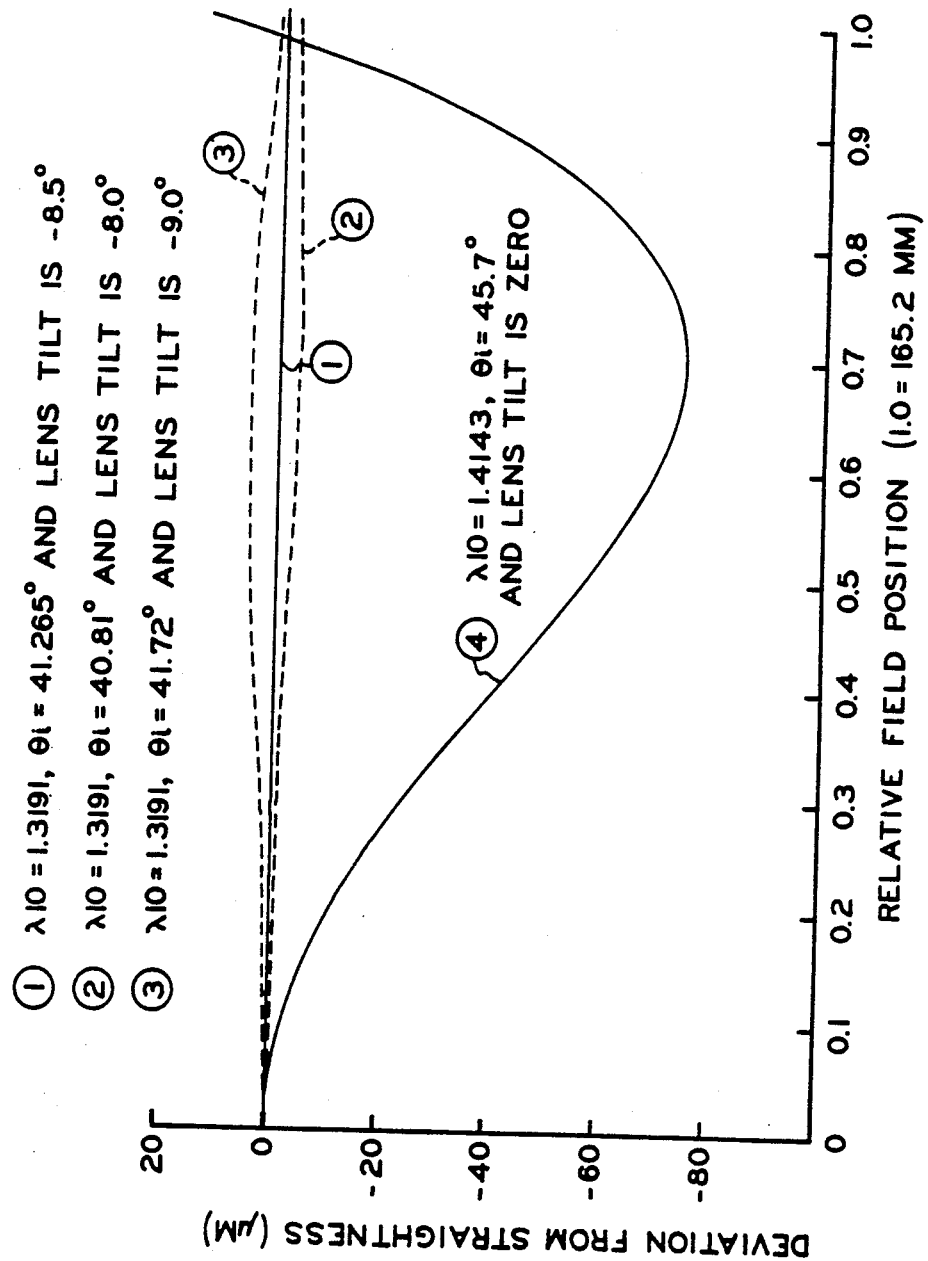

FIG. 4 are curves showing the scanning line on the image plane due to the effect of the focusing lens when the diffracted scanning beam is in the two positions shown in FIG. 3 by the dash and solid lines; and FIG. 5 is a graph similar to FIG. 2 showing four scanning lines in three of which the scanning line bow is minimized to varying extents, and in the other is not minimized, so as to illustrate the improvement provided in accordance with the invention.

Figure 1:
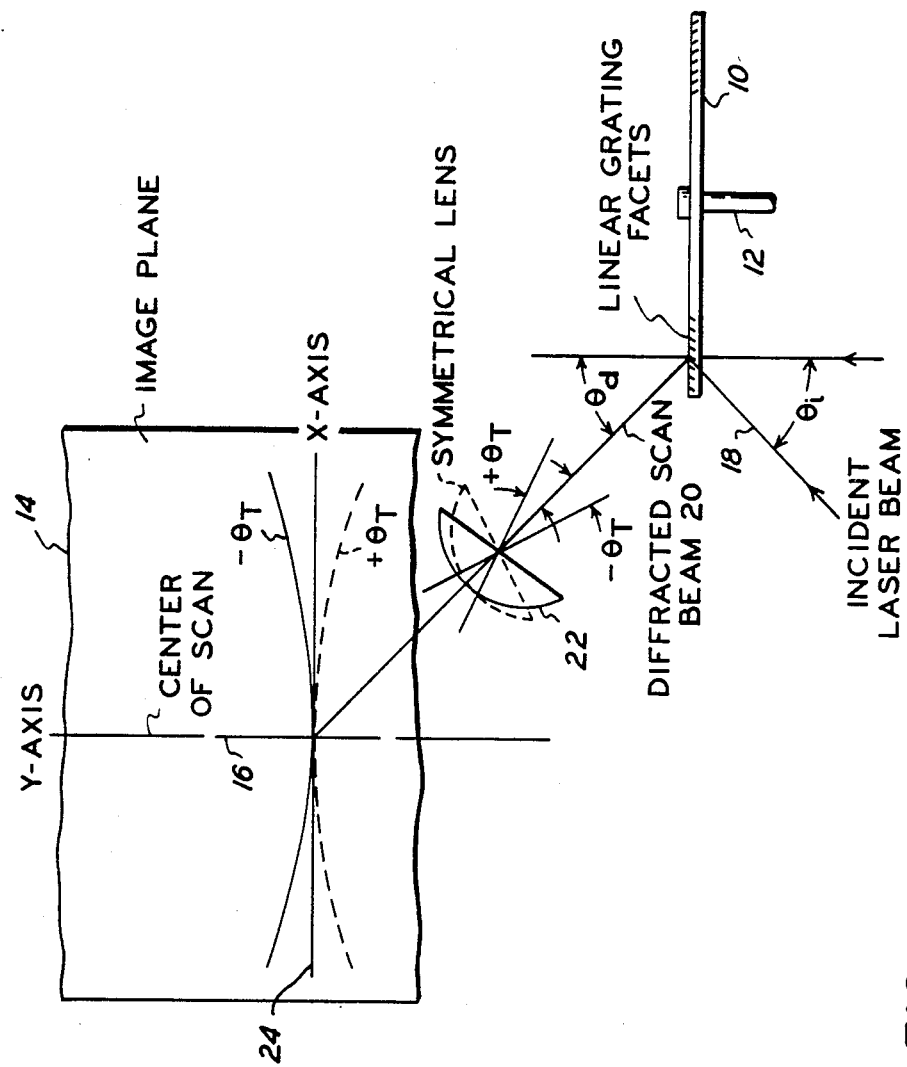
FIG. 1 is a diagramatic view illustrating an embodiment of the invention.

Referring first to FIG. 1, there is shown a rotatable hologon scanning disc or spinner 10 mounted on a rotor shaft 12. The rotor shaft 12 may be driven by a constant speed motor (not shown). The hologon spinner has a plurality of diffraction grating facets, each of which is for scanning a successive line on a surface 14 of a photoreceptor in an image plane. The photoreceptor is transported, along the vertical or y axis 16 so that successive scanning lines may be written on the photoreceptor by each facet. The hologon disc may be fabricated by techniques described in the above-identified documents authored by C. J. Kramer. Accordingly, there are a plurality of linear grating facets on the disc. An incident laser beam 18 is transmitted through the disc 10, diffracted by the grating to produce a diffracted scan beam 20. The angle of incidence of the incident laser beam is $\theta_i$, and the angle of diffraction of the diffracted beam 20 is $\theta_d$. The image plane is perpendicular to the diffracted beam 20.

A focusing lens comprised of symmetrical lens elements 22 focuses the diffracted beam to a spot on the image plane. This lens 22 is suitably a symmetrical, spherical lens and is preferably a doublet or triplet lens which has barrel distortion to linearize the velocity of the scan. The lens may also have pincushion distortion when bow correction alone is desired. Linearization of the velocity of the scan can then be accomplished electronically by changing the rate at which the pulses constituting the incident laser beam are produced.

The lens 22 is shown in two positions, namely, in solid lines at a tilt angle $+\theta_T$, and in dashed lines at a tilt angle $-\theta_T$ with respect to the diffracted beam. The angles $\theta_T$ are between the optical axis of the lens 22 and the direction of the beam. The angles are taken with the diffracted beam incident on the image plane at the center of the scan (the y axis) 16. The lens is rotated about a point within the lens where its optical axis intersects the diffracted beam 20.

The solid line designated $-\theta_T$ represents the bow in the scanning line introduced by the lens 22 alone when it is tilted at the angle $-\theta_T$. Similarly, the dashed line represents the bow introduced by the lens 22 alone when tilted at the angle $+\theta_T$. In this example, $+\theta_T$ and $-\theta_T$ are equal angles. Negative tilt angles provide a bow trajectory having increasing values about the center of scan, while positive angles of tilt provide the bow trajectory having decreasing values about the center of scan.

The x axis 24 is a straight line. Accordingly, the bow trajectory values due to the positive tilt angles are negative while the trajectory values due to the negative tilt angles are positive. These values are for a lens 22 having barrel distortion. In the case of a lens having pincushion distortion, the values will be opposite from the case of a lens having barrel distortion.

FIG. 2 illustrates how the bow curve produced by the tilted lens cancels and corrects the bow curve produced by the hologon deflector disc 10; producing a residual system curve which is corrected and without bow. The comparison is made for a linear diffraction grating with a $\lambda/d$ ratio of 1.3191, an incidence angle $\theta_i$ of 41.265°, a diffraction angle equal to $\theta_i$ and a tilt angle $\theta_T$ of $-8.5°$. The lens in this example is an air spaced triplet focusing lens comprised of spherical lens elements arranged to produce barrel distortion. The relative field position is the length of the scan line in the image plane with respect to the center of scan and corresponds to a maximum hologon disc rotation angle of $\pm 12.6°$ with respect to the center of scan. The focal length of the lens 22 is 530 millimeters (mm), in this example. The residual bow for the system is essentially zero as shown in FIG. 2.

Referring to FIG. 3, there is shown a hologon deflector disc 30 having a rotor shaft 32 driven by a constant speed motor 34. The hologon may have a plurality of grating facets spaced from each other circumferentially about the upper surface of the disc 30, as was the case for the hologon deflector disc 10 shown in FIG. 1. Two different scanner geometries are shown in this figure. In one case the incident beam provides a diffracted scan beam at an angle $\theta_{d1}$ and in the other case, at a greater diffracted angle $\theta_{d2}$. The beam which is diffracted at $\theta_{d1}$ is shown in dashed lines, while the beam which is diffracted at angle $\theta_{d2}$ is shown by the solid line. Both beams intercept an image plane 36 which may be the surface of a photoreceptor. A line perpendicular to the image plane bisects the diffracted scan beams and is designated as the Z axis of the system.

A focusing lens 38, is preferably comprised of a symmetrical spherical lens elements having barrel distortion, but may be a symmetrical spherical lens having pincushion distortion. This lens 38 has its optical axis coincident with the Z axis. Therefore, the lens 38 is tilted at $+\theta_T$ (counter clockwise) about an origin where its optical axis and the diffracted beams intersect. This is at the surface of the hologon disc 30. The lens 38 is tilted clockwise at an angle $-\theta_T$ with respect to the solid line diffracted scan beam. The resulting lens bow curves are illustrated in FIG. 4. It will be observed that these curves are displaced along the y axis. They will, of course, compensate for hologon produced bow, as was described in connection with FIG. 2.

Referring to FIG. 5, the residual system bow for different lens tilts and different incident angles and constant $\lambda/d$ values ($\lambda/d = 1.3191$ is illustrated). Curve (1) shows the residual system bow for the case illustrated in FIG. 2. Curves (2) and (3) illustrate minimization of residual system bow for different lens tilt angles with different angles of incidence $\theta_i$. The curves show that $\theta_i$ may be utilized in conjunction with lens tilt angle in order to correct for bow. These curves also show that bow may be corrected using the tilted focusing lens with distortion even where the angles of incidence and the $\lambda/d$ parameters due to the gratings on the hologon disc are at values which, according to the techniques described in the above-referenced documents authored by C. J. Kramer, do not minimize bow. For example, with a $\lambda/d$ of 1.319, the minimization technique according to the above-referenced documents authored by C. J. Kramer require, $\theta_i$ to be approximately equal to 34.68° and $\theta_d$ to be approximately equal to 48.59°. The system then would be sensitive to wobble effects.

Accordingly, there is much more freedom of design, especially in the selection of equal angles of incidence and diffraction to reduce wobble sensitivity without sacrificing minimization of system bow. It should be noted that for the expected distortion values obtainable with lenses that the hereindescribed system optimally compensates for bow, when bow produced by the hologon spinner is reduced, that is, when the $\lambda/d$ ratio resides in the range of 1 to 1.65.

With the focusing lens aligned along the diffracted beam (lens tilt equal to zero degrees), the curve (4) having the large bow as illustrated in FIG. 5 is obtained when the conditions in the above-referenced documents authored by C. J. Kramer are achieved ($\lambda/d=1.4143$ and $\theta_i=45.7°$). This bow can be reduced by tilting the focusing lens and nevertheless obtain the benefits of a $\lambda/d$ ratio of 1.4143 ($\sqrt{2}$ or approximately 45° angle of incidence).

From the foregoing description, it will be apparent that there has been provided improved methods and apparatus for correcting scanning line bow in deflector systems and particularly in hologon deflector systems. Variations and modifications of the herein described methods and apparatus, within the scope of the invention, will undoubtedly suggest themselves to those skilled in the art. Accordingly, the foregoing description should be taken as illustrative and not in a limiting sense.

I claim:

1. A preobjective hologon scanner comprising a hologon spinner containing at least one diffraction grating facet which diffracts an optical beam incident thereon, means for rotating said spinner so that the diffracted optical beam is scanned across an image plane, a focusing lens between the hologon spinner and the image plane, said focusing lens having distortion for changing the velocity of the scan of said diffracted beam along said image plane, and said focusing lens having its optical axis tilted with respect to the diffracted beam so as to correct for bow of said scan line.

2. The invention according to claim 1 wherein said focusing lens is comprised of symmetrical lens elements.

3. The invention according to claim 2 wherein said lens is comprised of spherical lens elements.

4. The invention according to claim 1 wherein the distortion in said lens is such that it linearizes the scan velocity of said beam across said image plane.

5. The invention according to claim 4 wherein said linearizing distortion is barrel distortion.

6. The invention according to claim 1 wherein said distortion is pin cushion distortion.

7. The invention as set forth in claim 1 wherein said hologon spinner is a disc having at least one linear diffraction grating facet having a constant grating period d, which diffracts an incident optical beam having a wavelength $\lambda$, such that the ratio of $\lambda/d$ resides within a range of 1 to 1.65 and the incident beam angle $\theta_i$ is such that the scan line across said image plane has a bow which increases only in one direction, said focusing lens being comprised of spherical lens elements, and being tilted in a sense with respect to said diffracted beam to bend said scan line in the direction opposite to said one direction.

8. The invention as set forth in claim 7 wherein $\lambda/d$ is equal to 1.3191, $\theta_i$ is equal to the angle of diffraction $\theta_d$ of said diffracted beam at the center of the scan, $\theta_i$ and $\theta_d$ are each about 41.265°, and the angle of tilt of said optical axis of said lens with respect to said diffracted beam is clockwise and is about 8.5°.

9. The invention according to claim 7 wherein said angle of tilt is the angle of rotation of said lens about a point in said lens where its optical axis intersects said diffracted beam.

10. The invention according to claim 7 wherein said angle of tilt is the angle of rotation of said optical axis about a point on said deflector where said optical axis and diffracted beam intersect.

11. The method for correcting for bow of a scan line produced in an image plane by a rotatable hologon beam deflector having a focusing lens with distortion for changing the velocity of scan of said line along said image plane which method comprises the step of tilting said lens with respect to the beam which is diffracted to bend said diffracted beam in a sense opposite to the bow thereof introduced by said deflector.

12. The method according to claim 11 further comprising linearizing the velocity of scan along said image plane.

13. The method according to claim 11 further comprising providing said lens with barrel distortion.

14. The method according to claim 11 further comprising providing said lens with pincushion distortion.

* * * * *